United States Patent [19]
Carpenter et al.

[11] 3,774,478
[45] Nov. 27, 1973

[54] ELECTRICAL INSULATION CUTTER AND STRIPPER

[75] Inventors: Louis M. Carpenter; Kenneth L. Dunn, both of Fayetteville, N.Y.

[73] Assignee: Carpenter Manufacturing Co., Inc., Manluis, N.Y.

[22] Filed: Dec. 23, 1971

[21] Appl. No.: 211,253

[52] U.S. Cl. .................................. 81/9.51, 83/643
[51] Int. Cl. ............................................ H02g 1/12
[58] Field of Search ............... 81/9.51, 9.5 R, 9.5 A; 83/643, 644, 646, 640, 641, 6, 8, 11

[56] References Cited
UNITED STATES PATENTS

| | | | |
|---|---|---|---|
| 3,630,105 | 12/1971 | Rider | 81/9.51 |
| 3,677,732 | 7/1972 | Dornan | 83/643 |
| 3,003,375 | 10/1961 | Hopkins | 81/9.51 |
| 2,562,950 | 8/1951 | Roessl et al. | 83/643 X |
| 2,915,928 | 12/1959 | Felts et al. | 81/9.51 |

FOREIGN PATENTS OR APPLICATIONS

| | | | |
|---|---|---|---|
| 609,834 | 10/1948 | Great Britain | 81/9.51 |
| 488,337 | 11/1952 | Canada | 83/641 |

*Primary Examiner*—Granville Y. Custer, Jr.
*Assistant Examiner*—Roscoe V. Parker
*Attorney*—F. P. Keiper et al.

[57] ABSTRACT

Apparatus for cutting through insulation around an electrical conductor from opposite sides simultaneously to within very close to the conductor, and then stripping the insulation off the conductor. The apparatus is especially suited to sever the insulation on flat, multi-lead cables formed of a plurality of individual conductors in side-by-side relationship surrounded by insulation and to remove a portion of the insulation from the conductors. Special mounting and adjusting means insure that the edges of the two opposing blades will remain precisely parallel as they cut the insulation to the exact depth for which they have been set.

15 Claims, 11 Drawing Figures

ELECTRICAL INSULATION CUTTER AND STRIPPER

The present invention relates to apparatus for cutting and stripping electrical insulation and, more particularly, to precision apparatus for cutting through insulation in which a plurality of side-by-side conductors are imbedded without danger of cutting or marring the conductors while making a clean cut and break of the insulation.

In many applications where insulated electrical conductors are used, removal of the insulation to effect connections to and between the bare wires can be a time-consuming operation. A number of different types of insulation cutting and stripping apparatus have been devised for simplifying and speeding up this task. Some apparatus has been suited for removing insulation from only one conductor at a time, while others are specifically designed to strip a plurality of wires which may be imbedded in a single, continuous piece of insulation. The present invention, while not limited thereto, is particularly useful in cutting through insulation enclosing several round or flat conductors in side-by-side relation, i.e., a flat ribbon, multiple-conductor cable.

A pair of blades with parallel cutting edges are provided and are adjustably mounted so that any desired depth of cut, up to a design limit maximum, may be made. As the blades are moved toward one another from opposite directions they are also moved laterally, thus providing a shearing cut, by virtue of the mounting arrangement through which the cutting motion is imparted. The pre-adjustment of blade edge position insures a precise spacing, slightly greater than the conductor diameter, at the inner limit of blade movement, and a substantially exact parallelism of blade edges throughout the cutting motion. After the blades have cut through the insulation from opposite sides to the approximate depth of the conductors, they are moved together for a preset distance along the length of the conductors to strip the insulation partially or completely therefrom while firmly clamping the unstripped portion of the cable in a stationary position.

It is a principal object of the present invention to provide apparatus for cutting and stripping insulation from individual electrical conductors or multi-conductor cables with a pair of cutting blades wherein novel and improved adjusting means are incorporated to insure a precise depth of cut while maintaining the cutting edges parallel.

A further object is to provide apparatus particularly suited to cutting and stripping insulation partially or fully from the ends of a plurality of separate electrical conductors arranged in separated, side-by-side relation in a single piece of insulation, while insuring that the blades do not contact the conductors during insulation cutting and removal.

Still another object is to provide an insulation cutter-stripper of the knife a blade type which is adjustable to extremely accurate tolerances while relatively simple and inexpensive, as well as rugged and durable.

A still further object is to provide electrical insulation cutting apparatus wherein a pair of blades are moved upon respective pivotal mountings by a single actuating member, the blade edges moving toward one another from opposite sides of the insulation and laterally opposite in an essentially shearing action.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts.

Figure 1:
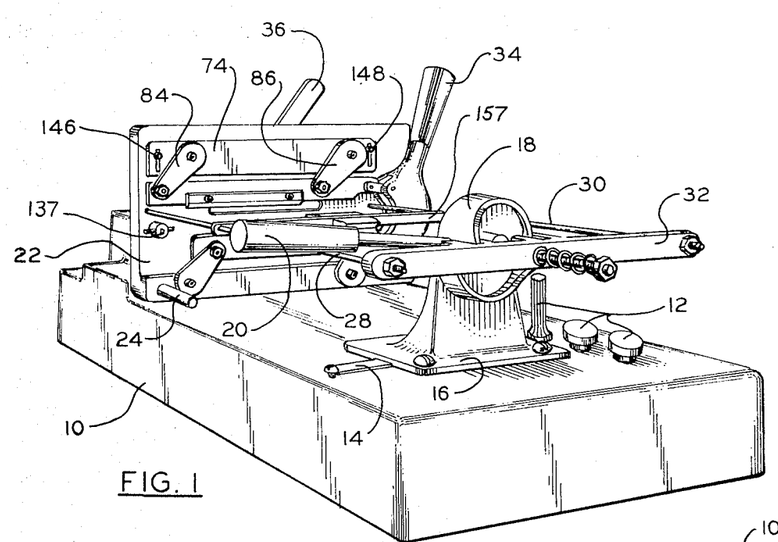
FIG. 1 is a perspective view of a preferred embodiment of the invention.

As seen in FIG. 1, the apparatus is mounted on a unitary base 10, which may include suitable openings for receiving the ends of the adjusting wrenches 12 and shim 14 used with the apparatus in a manner described later. Support 16 is bolted to base 10 and holds rotatable, cylindrical cam element 18, having handle 20 secured thereto for effecting reciprocal, manual rotation through about 180° in each direction. Support plate 22 is mounted for limited, slidng movement along stud 24, extending fixedly from a portion of base 10, and a similar stud 26 (FIG. 3) extending through the opposite side of the plate. A pair of rods 28 and 30 are affixed at one end to support plate 22 and at the opposite ends to lateral arm 32.

Handle 34 is pivotally mounted on support plate 22 and attached through a linkage arrangement described later in detail to the plates supporting the cutting blades. Handle 36, the top of which may be seen behind plate 22, is provided for moving the clamp which holds the insulated conductors in position during cutting and stripping, the complete mechanism associated with the clamping operation also being shown and described in connection with other FIGS. Thus, the three handles 20, 34 and 36 through which motion is imparted to perform the various steps in the operation of the apparatus may all be seen in FIG. 1. Of course, if powered rather than manual operation is desired, any or all of the handles may be replaced by appropriate motors, air cylinders, or the like.

Figures 2, 5A:
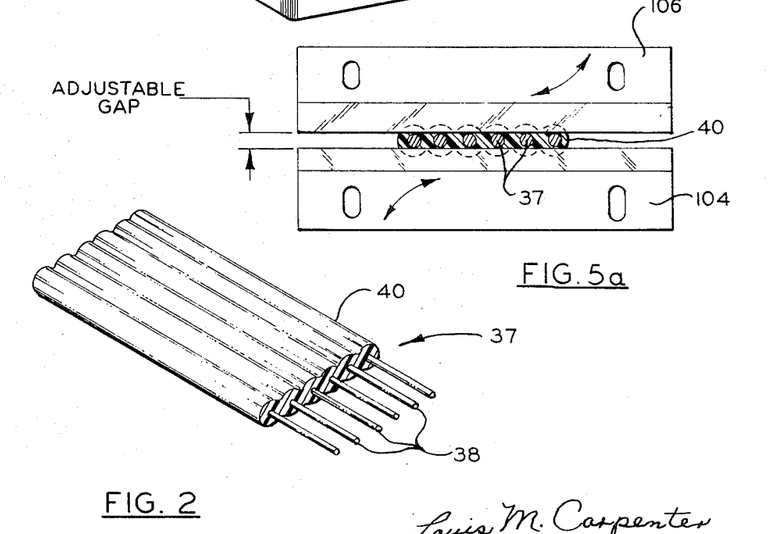
FIG. 2 is a perspective view of a multiple-wire conductor of the type with which the apparatus of FIG. 1 is utilized.
FIG. 5a is a front elevational view of portions of FIG. 5 illustrating the operation thereof.

In FIG. 2 is shown an example of the "flat ribbon" type of multiple lead cable, indicated generally by reference numeral 37, which the present invention is especially well suited to cut and strip. A plruality of conductors or leads 38 are arranged in side-by-side relation and encased in a continuous, unitary piece of insulation 40. Cable 37 is of the type commonly supplied in lengths much longer than that required in its final use, and cut as required. Before leads 38 can be individually connected to terminals, connectors, or other wires, a portion of insulation 40 must be stripped away. This must be done without breaking, cutting, or scratching any of leads 38; thus, the cutting of insulation 40 must be very precisely controlled so that the knife edge or other cutting tool stops short of leads 38 while cutting through as much of insulation 40 as possible.

Figure 3:
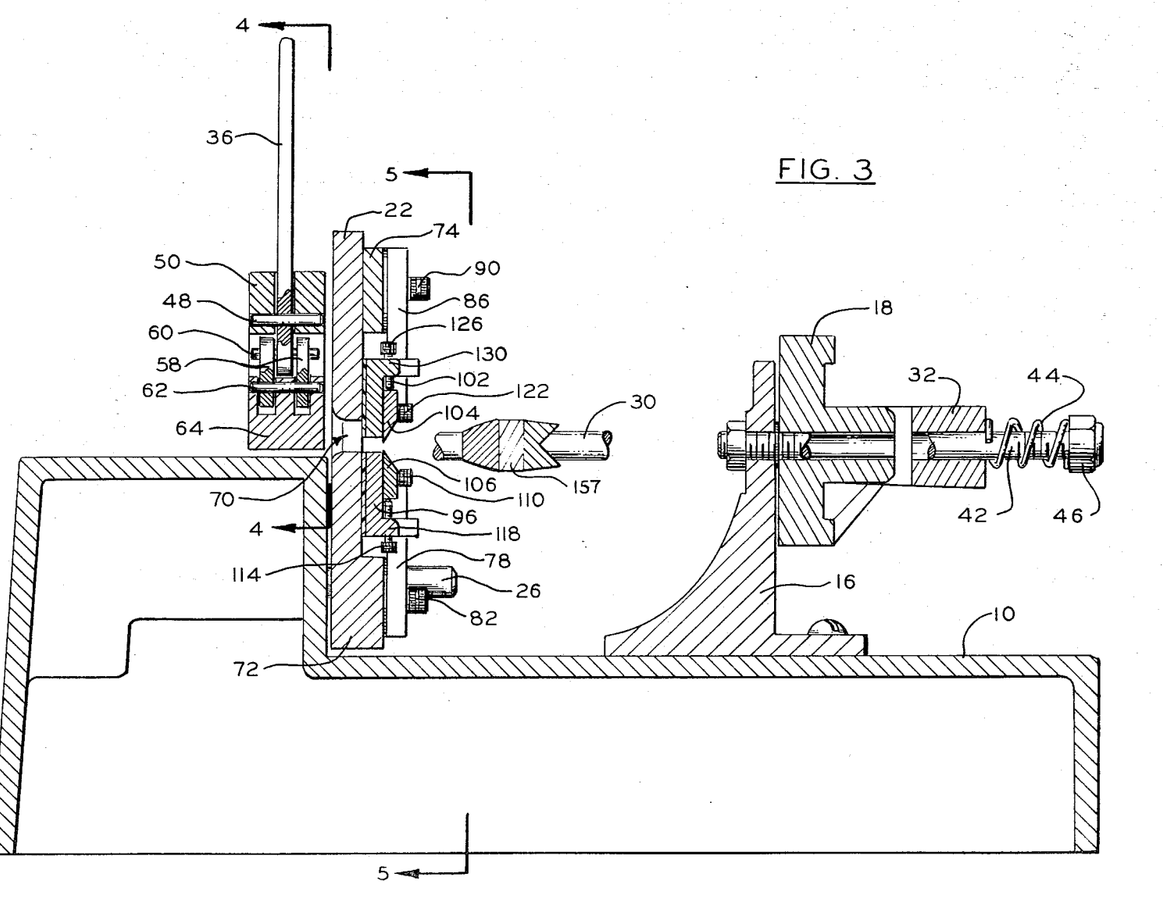
FIG. 3 is a side elevational view in vertical section through the center, with portions fragmented, of the apparatus of FIG. 1.

Turning now to FIG. 3, lateral arm 32 is seen to have a central opening with rod 42 passing loosely therethrough. The rod also passes through cam 18, which is rotatable thereon, and is secured to support 16. Spring 44 is compressed between a fixed stop on rod 42, provided by nut 46, and arm 32, biasing the latter toward cam 18. Portions of arm 32 rest against cam surfaces formed on the cylindrical edges of cam 18 so that rotation of the cam will move arm 32 to the right, as seen in FIG. 3, and spring 44 will move it back toward the left upon counter-rotation of the cam. The connection of arm 32, through rods 28 and 30, with support plate 22 moves the latter by a like amount with respect to base 10.

Figure 4:
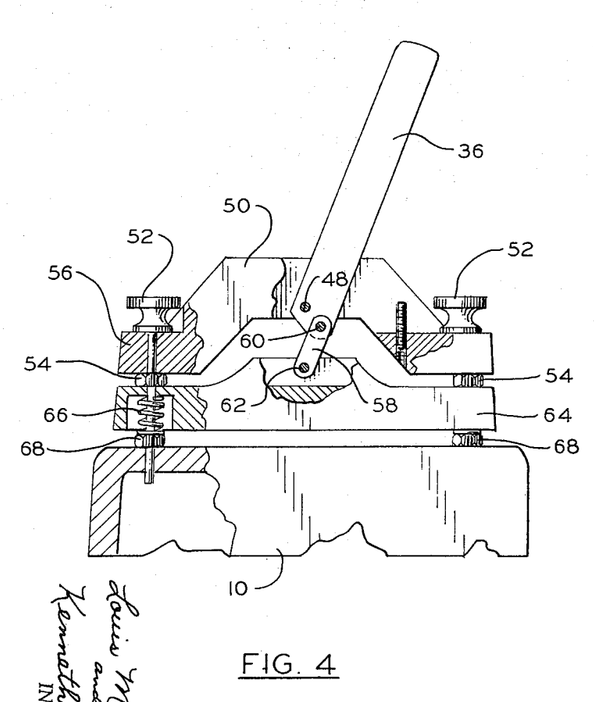
FIG. 4 is a fragmentary, elevational view, partly in section, as seen from the line 4—4 of FIG. 3.

Handle 36, as seen in FIGS. 3 and 4, is pivotally mounted by pin 48 in a lateral slot in arm 50 which is fixedly supported between upper and intermediate nuts 52 and 54, respectively, on pin 56 and a similar pin (not shown) on the opposite side. Links 58 are connected by pin 60 to handle 36 and by pin 62 to clamp 64. Springs 66 (only the one on the left being shown) are compressed between lower nuts 68 and clamp 64 to bias the clamp upwardly against nuts 54. Handle 36 may be moved to force clamp 64 downwardly against a cable placed between the clamp and base 10. Preferably, the connection of handle 36 through links 58 to clamp 64 is such that an over-center clamping action is achieved. Nuts 54 and 62 may be adjusted as required so that this action will be the same for cables of different thicknesses.

Figure 5:
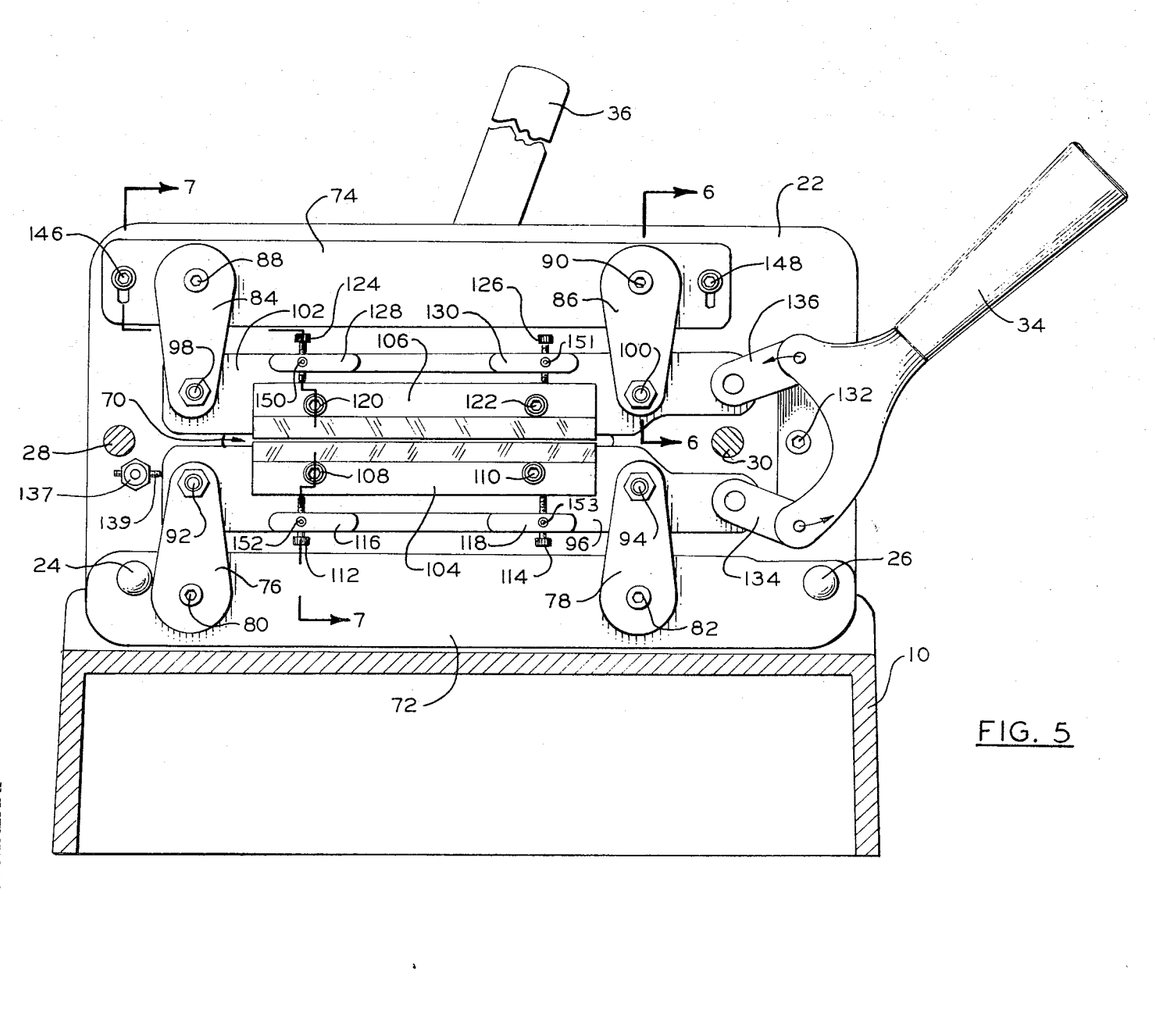
FIG. 5 is a front elevational view taken on the line 5—5 of FIG. 3.

Referring now to FIGS. 3 and 5, plate 22 is provided with an elongated opening 70 in a central portion through which the end of the cable to be stripped may extend. Plate 22 is provided with a raised portion 72 across the lower part of one side, and spacer plate 74 across the upper part of the same side. Lower pivot arms 76 and 78 are mounted on pins 80 and 82, respectively, on portion 72; upper pivot arms 84 and 86 are likewise mounted on pins 88 and 90 on spacer plate 74. The opposite ends of lower pivot arms 76 and 78 are pivotally connected by pins 92 and 94 to lower blade support 96; the opposite ends of upper pivot arms 84 and 86 are pivotally connected by pins 98 and 100 to upper blade support 102. Lower and upper cutting blades 104 and 106 are adjustably mounted on the respective blade supports. Locking screws 108 and 110 extend through slots in lower blade 104 to hold the blade firmly against support 96 after the edge of the blade has been positioned as required by adjusting screws 112 and 114 which extend through bosses 116 and 118, respectively, on support 96. Likewise, locking screws 120 and 122 hold blade 104 in the position set by adjusting screws 124 and 126 extending through bosses 128 and 130 on support 102.

Handle 34 is pivotally mounted on plate 22 by means of screw 132, as shown in FIG. 5. Links 134 and 136 are pivotally connected at opposite ends to handle 34 and to blade supports 96 and 102, respectively. This mounting and connecting means provides the desired movement of blades 104 and 106 as handle 34 is rotated about its pivotal mounting. As the end of handle 34 is moved upwardly from the position shown in FIG. 5 (i.e., the handle is rotated counterclockwise), the pivot points of links 134 and 136 on the handle are moved as indicated by the arrows. This motion is transmitted through the links to blade supports 96 and 102. The path of movement of the blade supports, the thus of blades 104 and 106, is constrained by their respective pivotal connections to lower pivot arms 76 and 78 and upper pivot arms 84 and 86. That is, the pivotal connection points of links 134 and 136 to the blade supports are freely movable since the pivotal connection of the links to handle 34 are also movable, whereas only the pivotal connection of the pivot arms to the blade supports are movable, the pivotal mounting of the other ends of the pivot arms being fixed. Therefore, each point on the blade edges follows an arcuate path concentric with the path of movement of the pivotal connections of the pivot arms with the blade supports. Thus counterclockwise movement of handle 34 from the FIG. 5 position will move blade 104 generally down and to the right while blade 106 will be moved up and to the left. Opposite rotation of handle 34 back to the FIG. 5 position will, of course, result in opposite movement of blades 104 and 106, thereby causing a shearing action of the blades as they move toward one another. That is, for the relatively short arc through which the blade edges are moved, the motion is essentially an opposing diagonal movement with respect to the conductor. This action is best illustrated in FIG. 5a, which shows the blade action with respect to the cable. As the blade edges cut through the insulation and approach the leads they are close to the point where the tangents to their paths of travel are parallel.

The closest position of the blade edges to one another is limited by contact of blade support 96 with a stop in the form of screw 139, the position of which may be adjusted by threading through support 137. The position of stop 139 must be such that it is contacted by blade support 96 before the respective pairs of pivot arms pass the point in their arcuate movements where the tangents thereto are parallel. That is, the stop should not be positioned so that it is contacted after the blade edges have passed their position of closest proximity to one another.

Figure 6:
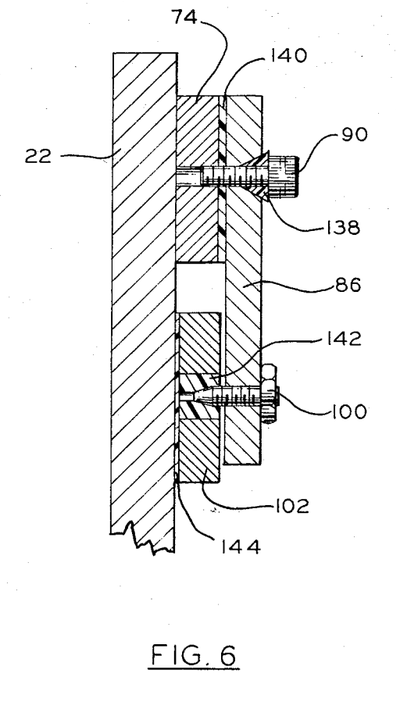
FIG. 6 is a fragmentary, side sectional view taken on the line 6—6 of FIG. 5.

FIG. 6 illustrates the manner of connection of the pivot arms between the fixed pivots and the blade supports. Upper pivot arm 86 is shown in FIG. 6, the manner of connecting the other three pivot arms being identical thereto. The fixed pivot for arm 86 is provided by screw 90, which passes through tapered collar 138 and an opening of slightly larger diameter in arm 86, and is threaded in spacer plate 74. The opening in arm 86 is countersunk to accept collar 138 which is held in close engagement with arm 86 by the head of screw 90. Anti-friction pad 140 is secured to the back of arm 86 to allow freely sliding movement on spacer plate 74. Screw 90 is preferably tightly engaged in collar 138 so that the movable engagement is between the collar and arm 86; tha is, neither screw 90 nor collar 138 rotates as arm 86 moves.

The movable pivot is provided by screw 100, threadedly engaged in arm 86 and having a tapered end which fits into a countersunk opening in bushing 142. The latter is press fitted in an opening in blade support 102.

Anti-friction pad 144 is secured to the rear face of support 102 to allow free sliding movement thereof on support plate 22. Thus, arm 86 is pivotally secured to spacer plate 74, but is not actually attached to blade support 102. Collar 138 and bushing 142, as well as pads 140 and 144, are preferably of a suitable plastic, the tapers and countersunk openings providing a self-centering action, insuring that there will be no play and that the established alignment will be maintained without need for extremely close manufacturing tolerances.

Figure 7A:
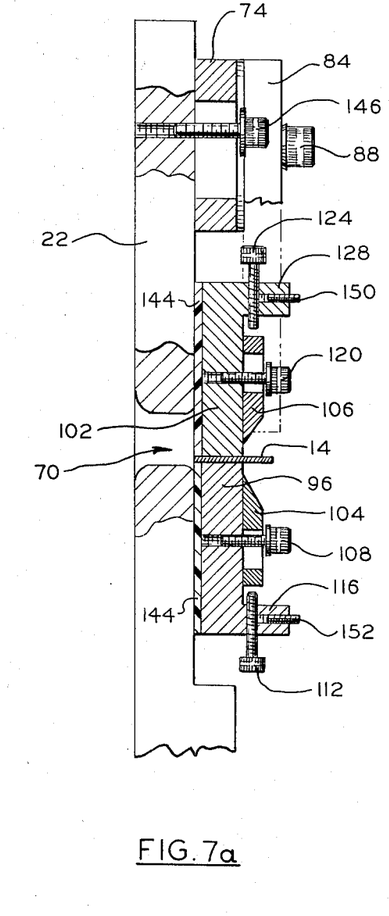
FIGS. 7a–7d are a series of fragmentary, side sectional views, all taken on the line 7—7 of FIG. 5, showing certain elements in various positions during adjustment thereof.
Figure 7B:
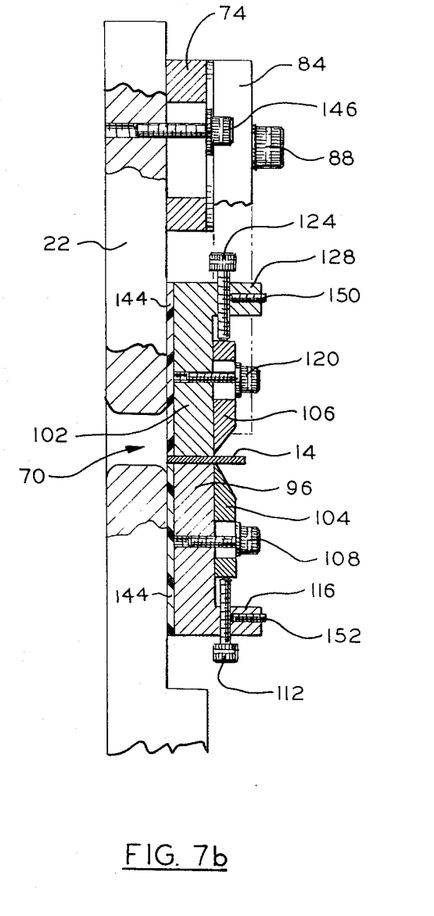
Figure 7C:
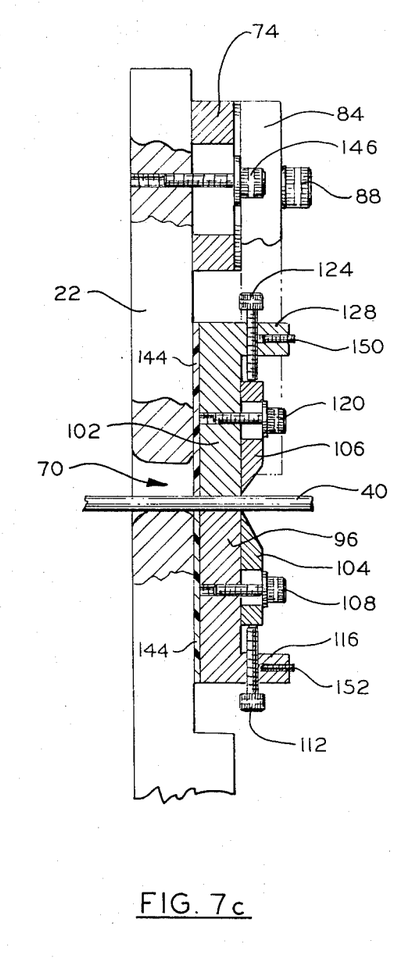

The set-up procedure will now be explained, with reference to the sequential views of FIGS. 7a–7d. It will be noted in FIGS. 1 and 5 that spacer plate 74 is held in engagement with support plate 22 by screws 146 and 148, passing through elongated slots in the spacer plate. The vertical position of the spacer plate, and thereby upper pivot arms 84 and 86 and blade support 102, may be adjusted by loosening screws 146 and 148. In the initial set-up step, the opposing edges of blade supports 96 and 102 are brought into substantially exact parallelism by moving handle 34 until blade support 96 contacts stop 137, placing flat shim 14 on the upper edge of lower blade support 96, loosening screws 146 and 148, and moving the lower edge of upper blade support 102 against the shim, as shown in FIG. 7a. (The blade edges have been previously been moved behind, or farther apart than, the opposing blade support edges.) Screws 146 and 148 are tightened to hold spacer plate 74 against support plate 22 as the next step is performed. All locking and adjustment screws of both blades are loosened (as in 7a) and the edges of both blades are moved against shim 14. The locking screws (108, 110, 120 and 122) are then tightened and the adjustment screws (112, 114, 124 and 126) are inserted to the point where they engage the back of the blades, as shown in FIG. 7b. Also, set screws 150 and 151 are threaded through bosses 128 and 130 to hold adjusting screws 124 and 126 in position. Likewise, set screws 152 and 153 are provided for adjusting screws 112 and 114. Both blade edges are now substantially exactly aligned with the adjacent edges of the respective blade supports, which is the purpose of the set-up steps described to this point.

Handle 34 is then rotated clockwise to move the blades and supports apart, and the conductor to be cut and stripped is placed therebetween, extending through opening 70 in support plate 22. Screws 146 and 148 are again loosened and handle 34 is moved counterclockwise to bring blade supports 96 and 102 together until they contact insulation 40 on conductor 37. Handle 34 is moved to its ocunterclockwise limit, thereby establishing the inner or closest position of the blade supports, and screws 146 and 148 are tightened. This is the position illustrated in FIG. 7c.

Conductor 37 is then removed and the positions of the blades are adjusted to achieve the desired depth of cut. The thickness of the total conductor, with insulation, and the thickness or diameter of the leads within the conductor must be known in order to calculate the blade setting.

Figure 7D:
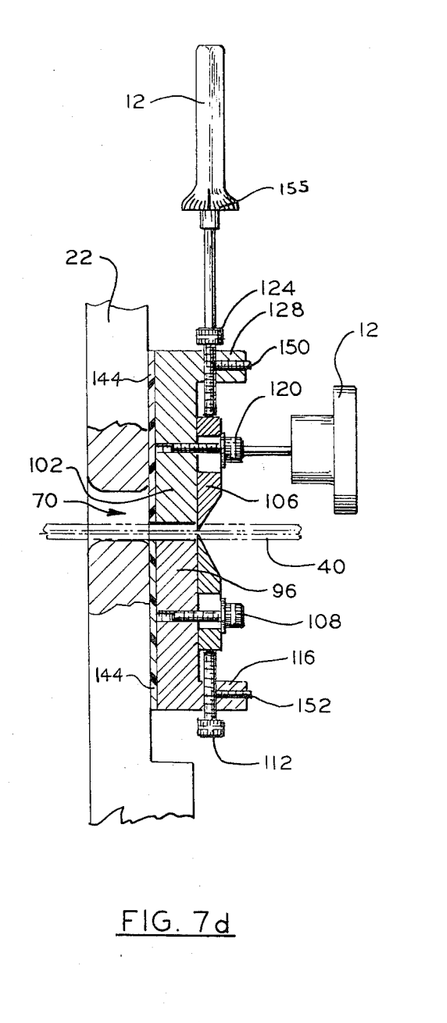

The edges of the blades are then extended past the adjacent edges of the respective blade supports by a distance equal to, or slightly less than, the thickness of the insulation on each side of the leads. Since the leads are normally centered within the insulation each blade edge may be extended by a distance equal to one half the total conductor thickness less the lead thickness or diameter. It is normally desirable to further reduce this distance by one or two mils to insure that the blades do not nick or scratch the leads as the insulation is cut or stripped. The blade edges are extended, as indicated in FIG. 7d, with the use of wrenches 14. In the illustrated embodiment the wrenches are of the conventional type which are inserted in an appropriately shaped socket in the head of the screw. Upper blade 106 is adjusted by slightly loosening locking screws 120 and 122 sufficiently to permit forced movement of the blade while still maintaining enough frictional engagement to prevent the blade from moving by itself. Adjusting screws 124 and 126 are then advanced (set screws 150 and 151 having been backed off) by an equal amount, corresponding to the necessary distance for the blade edge to be advanced. Since the adjusting screws were previously moved into engagement with the back of the blade, the amount of blade advancement will be precisely equal to the amount of screw advancement. If both adjusting screws are moved by precisely equal amounts the blade edge will remain parallel to the edge of the blade support. The pitch of the threads on the adjusting screws is known, of course, so tha amount of rotation necessary to produce the required advancement may be easily calculated. Notches 155, or other such markings, on the handle of the wrench used to move the adjusting screws ar correlated to thread pitch and thus ease the task of determining how much the screw is advanced. After adjusting screws 124 and 126 have been moved the required amount, locking screws 120 and 122 are tightened to fix the blade position, and set screws 150 and 151 are tightened to engage the adjusting screws. The cutting edge of blade 104 is then set in like manner.

The apparatus is now set up to cut and strip insulation 40 from conductor 37. Handle 36 is moved to lift clamp 64 and handle 34 is moved to separate blades 104 and 106 to the widest extent. The end of conductor 37 to be stripped is inserted under clamp 64 and through opening 70. An aprpopriate guide (not shown) may be provided adjacent to or in conjunction with the clamp, if desired, to position the conductor at a desired lateral position. Also, an adjustable guide or stop, such as that partially shown in FIGS. 1 and 3 and indicated by reference numeral 157, may be provided to limit the extent of movement of the conductor through opening 70. That is, the end of the conductor is butted against stop 157 (adjustable along rods 28 and 30, thus determining the length of insulation which will be stripped from the ends of the leads.

Handle 36 is then moved to clamp the conductor firmly in position. The insulation is then cut by moving handle 34 to the extent of its clockwise (FIG. 5) rotation to bring the blade edges and blade supports to their closest position. Handle 20 is then rotated to cause cam 18 to move support plate 22, and thereby the blade supports and blades, to the right from the position shown in FIG. 3. Since the blade edges have cut into the insulation and the conductor is clamped firmly behind the point of the cut, the engagement of the blade edges with the insulation will strip the latter off the stationary leads as the blades are moved. Movement may be stopped, of course, short of complete removal of the insulation from the leads, if desired.

The handles are then counter-rotated to release the cable and return the elements to their original positions. Handle 34 is first counter-rotated to open the cutting blades. Handle 36 is then released to raise clamp 64 and release the cable which may then be removed in the stripped condition. Finally handle 20 is counter-rotated to return support plate 22 and the elements mounted thereon back to their original position. The actual clamping cutting and stripping operation is quite fast and simple, involving as it does only the insertion of the conductor into the apparatus and the rotation and counter-rotation of three handles. The set-up operation, which need be performed only when a cable of different insulation and/or lead thickness is to be cut and stripped, is also relatively quick and easy for the degrees of precision involved. The unique manner of mounting and moving the various elements provides extreme accuracy and repeatability. The cutting action is such that the constantly parallel, tapered bearing, toggle pivoted blades sweep in toward the cable from opposite sides of the wire in opposite directions so that the opposing forces neutralize each other when the blades contact and cut part way into the insulation with a shearing action and precisely controled depth of cut with no chance of cable movement or over-cut at the bottom of the stroke where the arcs level out.

What is claimed is:

1. Apparatus for cutting and stripping insulation from an electrical conductor comprising, in combination:
   a. a stationary base;
   b. a support plate having an opening therein and mounted for reciprocal movement in a straight path substantially normal to the plane of said plate;
   c. means for releasably securing a portion of an insulated electrical conductor in a stationary position on said base and extending through said opening in said support plate;
   d. a pair of blade supports individually mounted on said support plate, on opposite sides of said opening, for movement in parallelism in arcuate paths about points on the same side of said opening as the respective blade supports;
   e. a cutting blade mounted on each of said blade supports with the cutting edges parallel to and facing one another;
   f. first means for effecting simultaneous movement of said blade supports, and thereby said blades, in opposite directions along said arcuate paths toward and away from a position of closest proximity wherein the tangents of said arcuate paths are parallel and said cutting edges extend in spaced relation across planes through said opening normal to the plane of said support plate and parallel to said cutting edges; and
   g. second means for effecting movement of said support plate, and thereby said blade supports and blades, along said straight path.

2. The invention according to claim 1 wherein said blade supports are each pivotally mounted on a pair of links extending between stationary pivots on said support plate and movable pivots on said blade supports.

3. The invention according to claim 2 wherein said blade supports include opposing edges which are parallel.

4. The invention according to claim 2 wherein said stationary pivots comprise a pivot member extending from an anchored position through an opening in said links and engaging the latter through a tapered bearing member urged by said pivot member into a similarly tapered portion of said opening.

5. The invention according to claim 2 wherein said movable pivots comprise a pivot member extending fixedly from said links into a tapered opening said blade supports, said pivot member having a tapered end portion mating with said tapered opening.

6. The invention according to claim 1 and further including adjusting means for selectively varying the positions of said blades relative to the respective blade supports.

7. The invention according to claim 6 wherein said adjusting means include locking means for releasably fixing the relative positions of said blades and blade supports, and positioning means engaging the edges of said blades opposite said cutting edges, whereby movement said positioning means is effective to vary the position of said cutting edges relative to said blade supports.

8. The invention according to claim 1 wherein said first means comprises a handle pivotally mounted on said support plate and connected to each of said blade supports to impart movement thereto along said arcuate path in response to movement of said handle about its pivotal mounting.

9. The invention according to claim 1 wherein said second means comprises a handle and rotary cam means so constructed and arranged that rotation of said cam means by movement of said handle is effective to move said support plate along said straight path.

10. Apparatus for cutting an article to a predetermined depth from each of two opposite sides thereof and stripping the cut portion from the uncut portion, said apparatus comprising, in combination:
   a. means for releasably clamping the article in a fixed position at a position thereon spaced from the position to be cut:
   b. a pair of cutting blades having opposed, parallel cutting edges;
   c. mounting means for each of said blades to allow movement thereof in respective arcuate paths with said cutting edges remaining parallel during said movement;
   d. first means for imparting movement to said blades simultaneously in opposite directions along said arcuate paths toward and away from a point of closest proximity of said cutting edges;
   e. second means for imparting movement to said blades simultaneously in the same direction normal to the plane of movement thereof along said arcuate paths, thereby moving the cut portion longitudinally in said same direction and stripping it from the underlying uncut portion; and
   f. adjusting means for individually and selectively advancing said cutting edges from a first position, wherein they are spaced apart at said point of closest proximity a distance equal to the thickness of the article at the position thereon to be cut, to a second position, spaced from said first position a distance equal to said predetermined depth.

11. The invention according to claim 10 wherein said adjusting means comprises screws of known pitch engaging edges of said blades opposite and parallel to said cutting edges, and releasable holding means for said blades allowing movement of said cutting edges in a plane common to both, whereby the distance of advancement of said cutting edges is a known function of the amount of rotation of said screws.

12. The invention according to claim 11 wherein said blades are respectively mounted on and movable with a pair of blade supports having opposing parallel edges relative to which said cutting edges are advanced.

13. The invention according to claim 10 and further including adjustable means associated with said apparatus for positioning an article in a desired orientation to said cutting edges.

14. The invention according to claim 13 wherein said adjustable means comprise a stop for positioning the end of an article to be cut a desired distance from said cutting edges.

15. The invention according to claim 10 and further including means for moving said blades together in a direction normal to a plane common to both of said cutting edges.

* * * * *